(12) United States Patent
Bastide et al.

(10) Patent No.: US 9,697,432 B2
(45) Date of Patent: Jul. 4, 2017

(54) GENERATING SUPPORT INSTRUCTIONS BY LEVERAGING AUGMENTED REALITY

(71) Applicant: International Business Machines Corporation, Armonk, NY (US)

(72) Inventors: Paul R. Bastide, Boxford, MA (US); Fang Lu, Billerica, MA (US); Alaa Abou Mahmoud, Dracut, MA (US)

(73) Assignee: International Business Machines Corporation, Armonk, NY (US)

( * ) Notice: Subject to any disclaimer, the term of this patent is extended or adjusted under 35 U.S.C. 154(b) by 148 days.

(21) Appl. No.: 14/564,374

(22) Filed: Dec. 9, 2014

(65) Prior Publication Data

US 2016/0162748 A1    Jun. 9, 2016

(51) Int. Cl.
*G09G 5/00* (2006.01)
*G06K 9/32* (2006.01)
(Continued)

(52) U.S. Cl.
CPC .......... *G06K 9/3266* (2013.01); *G06F 3/147* (2013.01); *G06K 9/00671* (2013.01); *G06T 11/00* (2013.01); *G06T 11/60* (2013.01); *G06T 19/006* (2013.01); *G09G 5/377* (2013.01); *G06K 2009/3291* (2013.01); *G06T 2219/004* (2013.01); *G09G 2340/10* (2013.01); *G09G 2340/12* (2013.01); *G09G 2354/00* (2013.01);
(Continued)

(58) Field of Classification Search
CPC .............................. G06T 19/006; G06T 19/00
USPC ........................................................ 345/633
See application file for complete search history.

(56) References Cited

U.S. PATENT DOCUMENTS

2006/0241792 A1\* 10/2006 Pretlove ................. G06Q 50/00
                                                                              700/83
2008/0100570 A1    5/2008 Friedrich et al.
(Continued)

FOREIGN PATENT DOCUMENTS

EP            2537141 A1    12/2012

OTHER PUBLICATIONS

Henderson, S. J., and Feiner, S. K. Augmented reality in the psychomotor phase of a procedural task. In Proc.ISMAR '11, IEEE Computer Society (2011), 191-200.\*
(Continued)

*Primary Examiner* — Jin Ge
(74) *Attorney, Agent, or Firm* — Mark G. Edwards

(57) ABSTRACT

A method for generating a sequence of support instruction steps by leveraging Augmented Reality (AR) can include: capturing workspace data from a workspace using a sensing device, wherein workspace may include a plurality of components, with at least one of the plurality of components having at least a tag; identifying both a first tag of a first component of the plurality of components, and a second tag of a second component of the plurality of components; determining, based on respective shapes of the first and second tags, that the first and second components are operably related; determining, again based on the first and second tags, a first operation; generating a first overlay, wherein the first overlay includes at least one image corresponding with the first operation; and generating a first augmented reality display of a first instruction step by combining the first overlay with a display of the workspace data.

18 Claims, 3 Drawing Sheets

(51) Int. Cl.
*G06T 19/00* (2011.01)
*G09G 5/377* (2006.01)
*G06F 3/147* (2006.01)
*G06T 11/00* (2006.01)
*G06T 11/60* (2006.01)
*G06K 9/00* (2006.01)

(52) U.S. Cl.
CPC . *G09G 2360/121* (2013.01); *G09G 2370/022* (2013.01)

(56) References Cited

U.S. PATENT DOCUMENTS

| | | |
|---|---|---|
| 2008/0130960 A1 | 6/2008 | Yagnik |
| 2012/0007852 A1 | 1/2012 | Morate et al. |
| 2012/0092528 A1 | 4/2012 | Jung et al. |
| 2012/0100520 A1 | 4/2012 | Jo et al. |
| 2012/0116728 A1* | 5/2012 | Shear ............... G06F 17/50 703/1 |
| 2013/0038633 A1* | 2/2013 | Maggiore ........... B01D 65/104 345/633 |
| 2013/0049976 A1 | 2/2013 | Maggiore |
| 2013/0137076 A1 | 5/2013 | Perez et al. |
| 2013/0249950 A1 | 9/2013 | Mahmoud et al. |
| 2013/0278635 A1* | 10/2013 | Maggiore ............ G06T 19/006 345/633 |
| 2015/0302650 A1* | 10/2015 | Abdelmoati ........... G06F 3/041 345/633 |

OTHER PUBLICATIONS

Gupta, A., Fox, D., Curless, B., and Cohen, M.Duplotrack: a real-time system for authoring and guiding duplo block assembly. In Proc. UIST '12 (2012), 389-402.*
V. Raghavan, J. Molineros, and R. Sharma, "Interactive evaluation of assembly sequences using augmented reality," IEEE Trans. Robot. Automat., vol. 15, pp. 435-449, 1999.*
"BMW Augmented Reality Concept", Airliners.net, Posted Sep. 3, 2009, © Copyright 2013 Demand Media, Inc. http://www.airliners.net/aviation-forums/non_aviation/read.main/2123353/.
Farkhatdinov et al., "Augmented Reality System for Teaching Vehicle Automatic Transmission Assembling/Disassembling", Korea University of Technology, School of Mechanical Engineering, Biorobotics Laboratory. http://robot.kut.ac.kr/ar_project.html.
Poupyrev et al., "Developing a Generic Augmented-Reality Interface", Computer, vol. 35, Issue 3, Mar. 2002, pp. 2-9, © 2002 IEEE.
Slocum, M., "Augmented Reality and the Ultimate User Manual", O'Reilly Radar, Radar: News & Commentary, Feb. 17, 2010, © 2013 O'Reilly Media, Inc. http://radar.oreilly.com/2010/02/augmented-reality-and-the-ulti.html.
Unknown, "Future Human Machine Interface: Augmented Reality", Rittal, Fascinating Future. http://www.fascinating-future.com/hmi/.
Villemez, "Augmented Reality Expands Borders of Tech Landscape", PBS Newshour, The Rundown: A blog of news and insight, Aug. 30, 2011, © 1996-2013 MacNeil/Lehrer Productions. http://www.pbs.org/newshour/rundown/2011/08/augmented-reality-making-waves-in-the-tech-landscape.html.

* cited by examiner

GENERATING SUPPORT INSTRUCTIONS BY LEVERAGING AUGMENTED REALITY

BACKGROUND

The present disclosure relates to augmented reality, and more specifically, to a system and method for generating a sequence of support instruction steps by leveraging augmented reality.

Augmented reality is a branch of imaging technology concerned with capturing images of real world environments and overlaying those images with computer generated information. The overlaid images can be rendered, often in real time, to present a viewer with augmented displays of the captured environments.

SUMMARY

According to embodiments of the present disclosure, a method for generating a sequence of support instruction steps by leveraging Augmented Reality (AR) can include capturing workspace data from a workspace using a sensing device. The workspace may include a plurality of components, with at least one of the plurality of components having at least a tag which both specifies that a component having the tag is operably related to at least one other component and identifies an operation with respect to the at least one other component. The workspace data can be analyzed to identify both a first tag of a first component of the plurality of components, and a second tag of a second component of the plurality of components. The method may also include determining, based on respective shapes of the first and second tags, that the first and second components are operably related, and determining, again based on the first and second tags, a first operation. Next, a first overlay can be generated, wherein the first overlay includes at least one image corresponding with the first operation. A first augmented reality display of a first instruction step can then be generated by combining the first overlay with a display of the workspace data.

According to various embodiments, an augmented reality system for generating a sequence of support instruction steps by leveraging Augmented Reality (AR) can be configured to: capture workspace data from a workspace using a sensing device, wherein the workspace includes a plurality of components, at least one of the plurality of components having at least a tag which both specifies that a component having the tag is operably related to at least one other component and identifies an operation with respect to the at least one other component; identify from the workspace data, both a first tag of a first component of the plurality of components, and a second tag of a second component of the plurality of components; determine, based on respective shapes of the first and second tags, that the first and second components are operably related; determine, based on the first and second tags, a first operation; generate a first overlay, wherein the first overlay includes at least one image corresponding with the first operation; and generate a first augmented reality display of a first instruction step by combining the first overlay with a display of the workspace data.

Various embodiments are directed towards a computer program product for generating a generating a sequence of support instruction steps by leveraging Augmented Reality (AR), the computer program product comprising a computer readable storage medium having program instructions embodied therewith, wherein the computer readable storage medium is not a transitory signal per se, the program instructions executable by a processing circuit to cause the processing circuit to perform a method comprising: capturing workspace data from a workspace using a sensing device, wherein the workspace includes a plurality of components, at least one of the plurality of components having at least a tag which both specifies that a component having the tag is operably related to at least one other component and identifies an operation with respect to the at least one other component; identifying, from the workspace data, both a first tag of a first component of the plurality of components, and a second tag of a second component of the plurality of components; determining, based on respective colors of the first and second tags, that the first and second components are operably related; determining, based on the first and second tags, a first operation; generating a first overlay, wherein the first overlay includes at least one image corresponding with the first operation; and generating a first augmented reality display of a first instruction step by combining the first overlay with a display of the workspace data.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
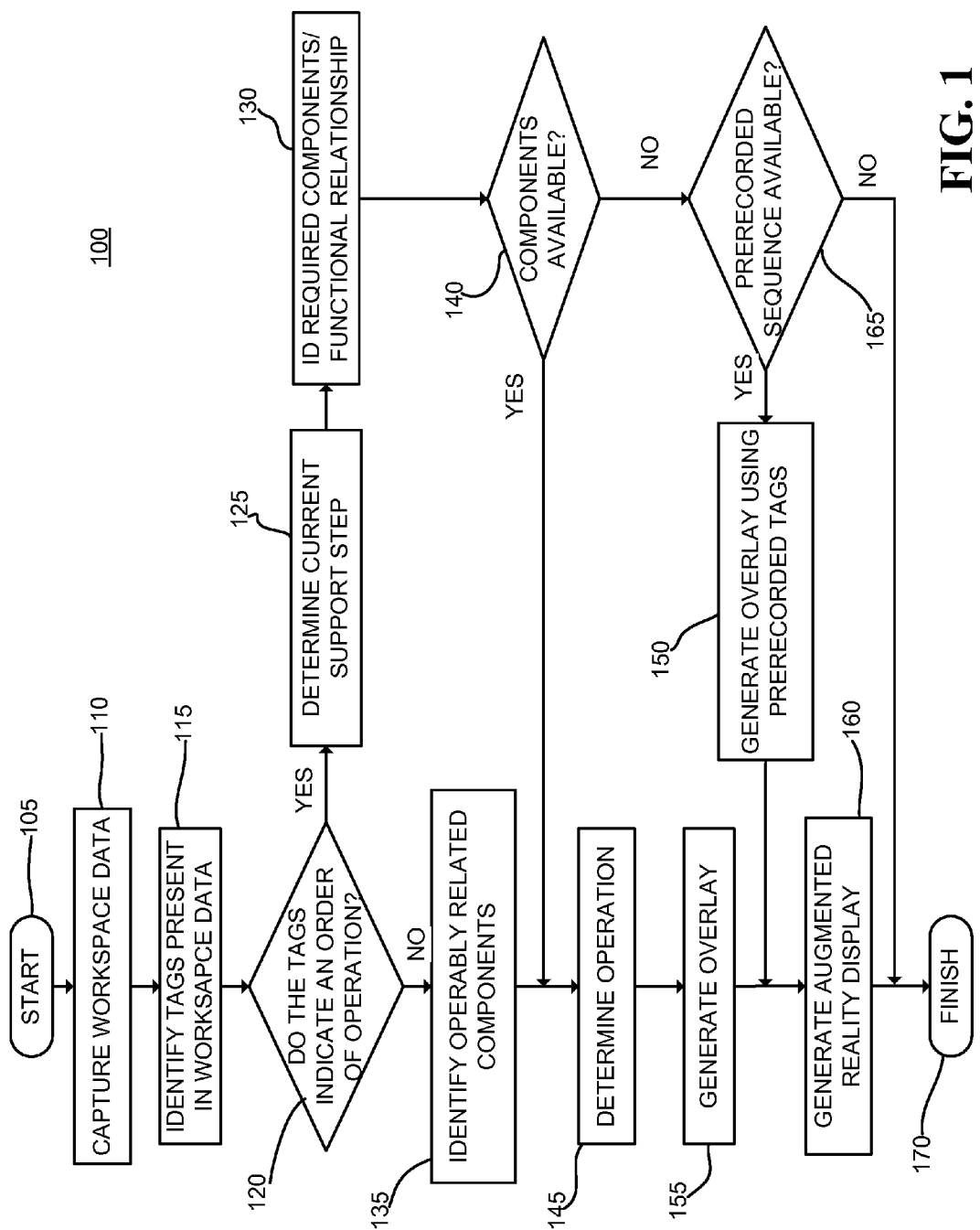
FIG. 1 depicts a flowchart of a method for generating a sequence of support instruction steps by leveraging augmented reality, according to various embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to augmented reality, more particular aspects relate to a system and method for generating a sequence of support instruction steps by leveraging augmented reality. While the present disclosure is not necessarily limited to such applications, various aspects of the disclosure may be appreciated through a discussion of various examples using this context.

Embodiments of the present disclosure are directed towards an augmented reality system that can be used to provide support instructions to a user. The system can include a sensing device such as a digital camera, a computing device such as a smart phone, and a display device.

Images can be captured by the sensing device and processed by the computing device to extract information or directions encoded in augmented reality tags. The extracted information can them be used to generate an augmented reality display which may be presented to a user on the display device.

Augmented reality has the potential to place volumes of information about the environment in the line of sight of a user, and thus change the way they interact with the world. For example, augmented reality (AR) systems that are capable of generating augmented images in real time may add to a user's interaction with his environment by providing updated information about objects as he encounters them. Augmented reality systems may provide a real time filter against the volumes of information confronting users in their daily environment by tagging or highlighting objects of interest, thus bringing them to the foreground. Augmented reality systems may provide task support to a user by overlaying information relevant to the user's objectives and interest over images captured as he moves through his environment.

An augmented reality system that can perform as described herein may include components for capturing images from an environment or workspace, processing the captured images to identify objects of interests, and rendering images augmented with computer generated information. The pervasiveness of handheld devices with built in digital cameras, processors, and displays means that AR can be used to provide support in everyday scenarios.

Embodiments of the present disclosure are directed towards a system and method for generating a sequence of support instructions by leveraging augmented reality. Support instructions can include the steps and directions for assembling a product, repair or performing maintenance on object, and preparing or installing a structure. According to various embodiments, a sensing device can capture workspace data, including information about a plurality of components. A processing device can analyze the workspace data to identify augmented reality tags on the components. The AR tags can be used to determine functional relationships between components, and identify an operation to be performed with the components. An overlay containing computer generated images symbolizing the tags and the operation can then be generated. The overlays can be combined with the captured workspace data to generate an augmented reality image of a support instruction step. Multiple augmented reality images can be generated in sequence to provide an animation of an instruction step.

According to various embodiments, a method for generating a sequence of support instructions steps by leveraging augmented reality may include capturing workspace data from a workspace using a sensing device. A workspace may be any area allocated for performing a task for which a sequence of support instruction steps may be useful. In some embodiments, a plurality of components required for completing the task may be distributed throughout the workspace. By way of example, a task may include setting up a personal computer (PC), and the workspace may be a desk or workbench. The plurality of components distributed throughout the workspace may include peripheral devices such as a computer mouse, computer keyboard, display monitor, and central processing unit (CPU) box.

In some embodiments, the sensing device may be any device, capable of capturing data from the workspace, such as a cellphone's digital camera. The captured data may be a single image of at least a portion of the workspace, and may include at least one of the components distributed through the workspace. The sensing device may scan the workspace (e.g. the field of view of the sensing device may be rotated or translated around the workspace) to capture a sequence of images showing different areas of the workspace, and the components located therein.

Each component in the workspace may have at least one augmented reality tag. The tags may include elementary shapes such as circles, triangles, rectangles and squares. Additionally, the tag may specify that a component having the tag is operably related to at least one other component. Two components may be operably related if they may be used together to, inter alia, perform a function or complete an aspect of an assembly (e.g., a power cord connected to an electronic device and a power outlet may be operably related because the power cord can be plugged into the outlet to provide power to the connected device). The tag may also identify an operation with respect to a plurality of components. In some embodiments, the color of the tag may indicate a relationship between components, while the shape of the tag may specify an operation to be performed with respect to a plurality of components. According to various embodiments, a circle may represent the act of plugging one component into another, a rectangle may indicated a twisting operation, and triangle may represent a pinching lock. For the task of setting up a PC, including the workspace, both the mouse port on the CPU box and the cable attached to the computer mouse may be tagged with a green circle, indicating that the mouse port and cord are functionally related and that the cord should be plugged into the port. Similarly, the keyboard port and corresponding keyboard cable may be tagged with a purple circle, indicating that the keyboard and keyboard port are functionally related, and that the keyboard cable should be plugged in to the keyboard port.

According to some embodiments, the augmented reality tag may include an indication of the sequence, or order, in which operations should be performed. The indicator may be any symbol, including a shape, number, barcode, and quick response code (QR code). In some embodiments, the tags may also include other pieces of information relevant to task and components, including information about the orientation of components.

The method described herein may also include identifying the tags associated with each component. Identifying the tags may include analyzing a set of captured workspace data to locate the tags contained therein. The tags can then be analyzed to extract associated information, including the shape, color, and location of the tags. The workspace data may be analyzed using image processing algorithms, including image segmentation and optical character recognition algorithms. In some embodiments, the extracted information can be stored in a database for later use. If used, the database may be updated each time a set data representing a new view of the workspace is captured and analyzed.

The method may also include determining, based on the extracted tag information, the components that are operably related. In some embodiments, determining whether any two components are operably related may include searching the extracted data for tags having the same shape and/or color. In other embodiments, two tags having the same color may indicate that the two components associated with the tags are used to complete one operation, while the shape of the tags may indicate the operation. In particular embodiments, the association may be reversed, with the shape indicating the relationship and the color indicating operation. Some components may have a plurality of tags, indicating that the components are operably related to a plurality of other components.

The method may also include determining, based on the tags associated with related components, an operation to be performed with respect to the related components. In some embodiments, the operation may be determined by searching the extracted data to determine the shape of the tags associated with the related components. For example, in some embodiments, a circle may represent the act of plugging one component into another, a rectangle may indicated a twisting operation, and triangle may represent a pinching lock. Alternatively, in some embodiments, the operation may be determined by searching the extracted data to identify the color of the tags associated with related components. For example, red may represent the act of plugging one component into another, blue may indicated a twisting operation, and yellow may represent a pinching lock.

The method may further include generating an overlay. An overlay may be computer generated image having both transparent and opaque features the may be rendered or superimposed over another image. A feature in an overlay may itself be a computer generated image. The overlay may include substantially opaque features, such as alpha-numeric characters, indicating the instruction step associated with the overlay. In some embodiments, the overlay may include features representing the tags of the related components involved in the instruction step. In other embodiments, the overlay may include features representing the tags associated with all components that were identified in the current set of workspace data. The location data for each tag, extracted from the analysis of the workspace data, may be used to determine a location in the overlay for each feature representing the tag. The overlay may also include features representing the operation associated with the current instruction step. Location data for tags involved in the operation may be used to determine where in the overlay to place the feature representing the operation. In some embodiments, the orientation in the overlay of the features representing the tags and operations may be changed to reflect a dominant hand used by the user of the AR system. For example, an image (e.g., an arrow) in the overlay indicating that an operation is performed from left to right may be reversed to indicate that the operation is performed from right to left. The user's dominant hand may be determined from the user's account or profile information accessible by the AR system.

The overlay may also include informational features. For example, if an operation was completed incorrectly (e.g., a step was completed out of sequence, or an incorrect cable was connected to a port) images or features indicating the error may be included in the overlay. The overlay may also include features representing tags and operations associated with components that were not captured or identified in the current set of workspace data. These tags may have been identified in a previous set of workspace data, or they may have been extracted from a prerecorded sequence of support instruction steps for performing the same task. Consequently, the present disclosure may allow a user to skip instruction steps by selectively creating an overlay having features relevant to the desired starting instruction step. A second consequence of this aspect of the disclosure is that some embodiments may be able to predictively display the next logical instruction step in the task without the required components being in view of the sensing device. A new overlay may be generated each time a set of workspace data is captured. The overlay may also be updated periodically to animate the feature representing the operation.

The method may also include generating an augmented reality display of an instruction step by combining the overlay with a display of the workspace data. As discussed herein, the workspace data may be a captured image of an area of the workspace. Creating the augmented reality display may include combining the overlay with the captured image so that the substantially opaque features in a given location of the overlay are rendered on top of similarly located features in the captured image. A new augmented reality display of an instruction step may be generated each time the overlay is updated.

Each augmented reality display may be recorded to create a sequence of images showing the AR display of a plurality of instruction steps. The recording may include separate images of the overlay, the workspace data, and the combined AR image. The recordings may be transmitted to another computer system/server and stored in a user accessible repository, including a database or the file system of a computer server where it can be subsequently processed. Processing the stored recordings can include analyzing it to determine problems users encountered while completing the sequence of instruction steps. Processing the stored recordings may also include viewing the sequence of instruction steps, sharing it with other users, and using it supplement the generation of another sequence of support instruction steps for performing the same task.

Turning now to the Figures, FIG. 1 depicts a flowchart of a method 100 for generating a sequence of support instruction steps by leveraging augmented reality, according to various embodiments. The method begins by activating the augmented reality system at block 105. The method may proceed by capturing a set of workspace data (e.g., using a sensing device such as a video camera), as indicated in block 110. As discussed herein, a set of workspace data may include an image of an area of a workspace (e.g., a still image of a room having components and tools for assembling an office chair). The image may then be analyzed to identify tags present in the workspace data, consistent with block 115. As previously discussed, the analysis may include building a database of information related to the identified tags, including the shapes, colors, and locations of the tags. The method may then determine whether the tags or the related information include an indication of an order of operation for the instruction steps, as depicted in block 120. If there is no indication of an order of operation, the method proceeds to block 135, while the method may proceed to block 125 if there is an indication of an order of operation.

When there is no indication of an order of operation, the next step in the method is to identify components that are operably related (e.g., a hinge that can be connected to a door to allow an appliance to open and close), consistent with block 135. Operably related components can be identified by analyzing the shapes and/or colors of the tags identified in step 115. This information may be added to a database or network of related components.

The method may then determine an operation to be performed with respect to the related components, as illustrated in block 145. The operation can be determined by analyzing the shapes or the colors of the tags identified in step 115. Determining the operation may also include using information about the order of operation (if available) to determine the current instruction step and to select components involved in the current step. The operation can then be determined by analyzing the tag information associated with the selected components.

The method may then generate an overlay as described herein, and illustrated by block 155. The overlay can be generated by image processing software running on the computer system described subsequently in FIG. 3. Once the overlay is generated, the method may generate an augmented reality display, consistent with block 160. Generating the AR display includes combining the overlay created in block 155 (or block 150) with an image of the workspace data captured in block 110. Generating the AR display may also include rendering the combined image of the overlay and workspace on a display device. The method may then finish at block 170.

If there is an indication of an order of operation at block 120, the method may proceed to block 125. At block 125, the method may determine the current instruction step by comparing the tags and related information identified in block 115 against a record of previously completed steps. The method may then identify the components involved in the current instruction step, as indicated in block 130. The components may be identified by searching a database of identified components for tags having related information indicating that the components associated with the tags may be involved in the current step. In some embodiments, the search may be limited to tags extracted from the current set of workspace data.

Once the components required for the current instruction step are identified, the method determines whether the identified components are present in the current set of workspace data, as illustrated in block 140 (e.g., by analyzing the tags identified in the method step described in block 115). If the components are present in the current set of workspace data, the method proceeds to block 145. If the components are not present, the method determines whether information about the components are available in a database generated from a prerecorded sequence or other sets of workspace data, consistent with block 165. The prerecorded sequence may be a recording of a sequence augmented reality steps (this may include the augmented reality displays, workspace data, overlays, and tag information) executed while performing the current task at a previous time. The information about the components required for an instruction step may be extracted from the corresponding instruction step in the prerecorded sequence as described in the method step associated with block 115. If the information about the required components are available from one of these sources, the method may generate an overlay using the tag information from the available source, as show in block 150. The method may then proceed to block 160. If the components are not available in a database, the method may end at block 170.

Figure 2:
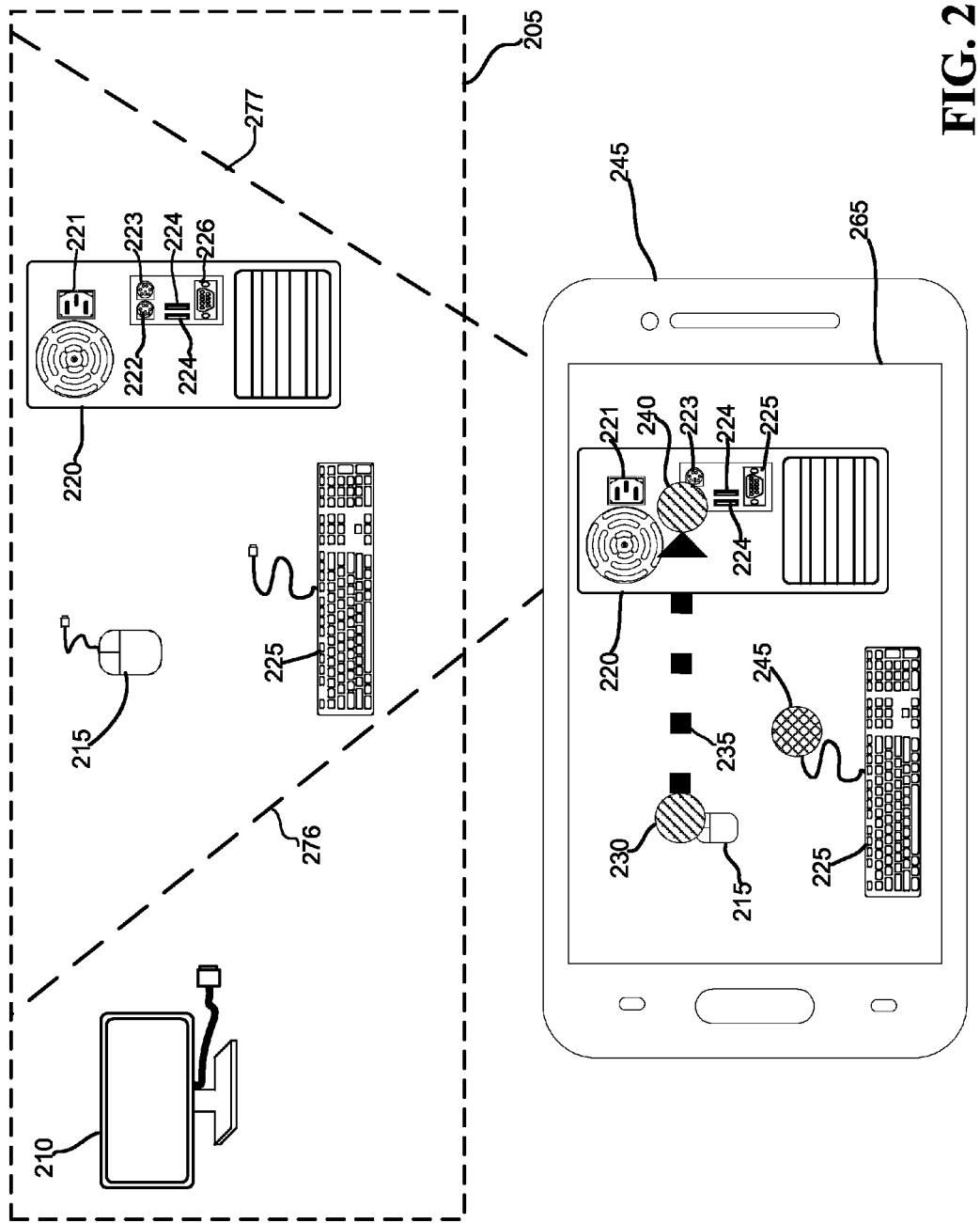
FIG. 2 depicts a workspace having multiple components, and an augmented reality enabled device with an augmented reality display of the workspace, according to various embodiments.

FIG. 2 depicts a workspace having multiple components to be assembled, and an augmented reality enabled device showing an augmented reality display of the workspace, according to various embodiments. Workspace 205 is configured to perform the task of assembling a personal computer (PC), and includes a plurality of components, such as display monitor 210, computer mouse 215, computer keyboard 225, central processing unit (CPU) box 220, power supply port 221, computer mouse port 222, computer keyboard port 223, universal serial bus ports 224, and serial port 226.

FIG. 2 also includes computing device 245, having a display 265. Computing device 245 may also include a built in sensing device, such as a digital camera. The sensing device may have a field of view delineated by lines 276 and 277. The sensing device can capture a set of workspace data in the workspace area located between lines 276 and 277. For example, the captured workspace data may include all components in the workspace 205 except for display monitor 210, which is outside the workspace area delineated by lines 276 and 277. The computing device's 245 display 265 shows an augmented reality display for an instruction step involving connecting a computer mouse 215 to the mouse port 222 on the CPU box 220. The augmented reality display may be generated from a captured set of workspace data and an overlay generated as described herein. The AR display includes computer generated features 230, 235, 240, and 245. The fill patterns of features 230, 240, and 245 indicate color. For example, feature 230 and 240 have the same striped fill pattern, indicating that they are the same color.

Features 230 and 240 are rendered over the computer mouse cable and the computer mouse port, respectively, indicating that the mouse cord and port are operably related. Feature 235 shows an arrow extending from feature 230 to feature 240, indicating the action to be performed with respect to the two components. Feature 245 identifies the keyboard cable as a tagged component to be used in another instruct step. In some embodiments, feature 245 may not appear in an AR display until the instruction step involving the keyboard is the current instruction step.

Figure 3:
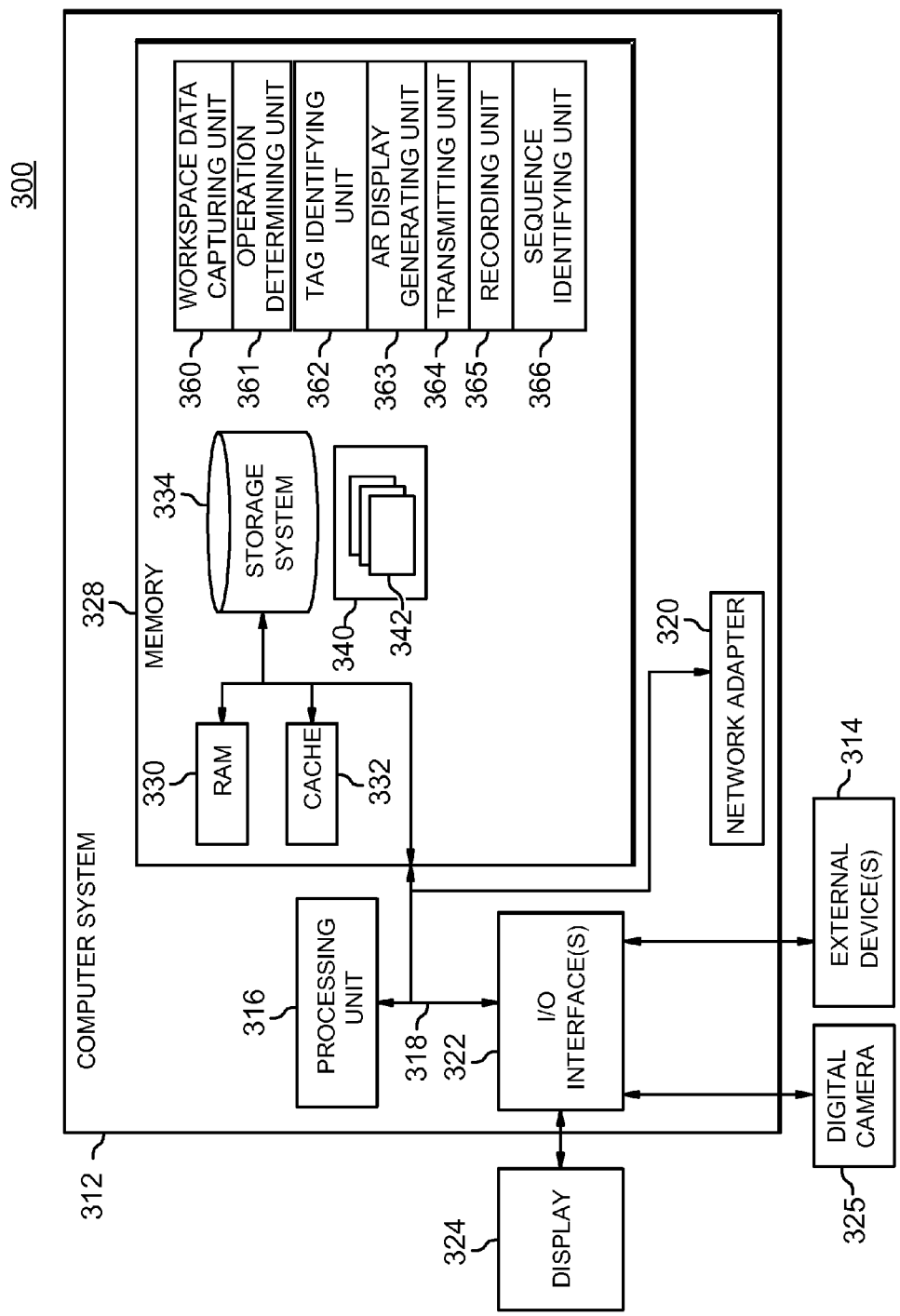
FIG. 3 depicts a schematic of an example system for generating a sequence of support instruction steps by leveraging augmented reality, according to various embodiments.

FIG. 3 depicts a schematic of an example system for generating a sequence of support instruction steps by leveraging augmented reality, according to various embodiments. System 300 is only one example of a suitable augmented reality system and is not intended to suggest any limitation as to the scope of use or functionality of embodiments of the invention described herein. Regardless, AR system 300 is capable of being implemented and/or performing any of the functionality set forth hereinabove.

In augmented reality system 300 there is a computer system/server 312, which is operational with numerous other general purpose or special purpose computing system environments or configurations. Examples of well-known computing systems, environments, and/or configurations that may be suitable for use with computer system/server 312 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 312 may be described in the general context of computer system-executable instructions, such as program modules, being executed by a computer system. Generally, program modules may include routines, programs, objects, components, logic, data structures, and so on that perform particular tasks or implement particular abstract data types. Various components of computer system/server 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 312 in AR computing device 300 is shown in the form of a general-purpose computing device. The components of computer system/server 312 may include, but are not limited to, one or more processors or processing units 316, a system memory 328, and a bus 318 that couples various system components including system memory 328 to processor 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 312 typically includes a variety of computer system readable media. Such media may be any available media that is accessible by computer system/server 312, and it includes both volatile and non-volatile media, removable and non-removable media.

System memory 328 can include computer system readable media in the form of volatile memory, such as random access memory (RAM) 330 and/or cache memory 332. Computer system/server 312 may further include other removable/non-removable, volatile/non-volatile computer system storage media. By way of example only, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments of the invention.

Program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 may interface with workspace data capturing unit 360 for capturing an processing workspace data, operation determining unit 361 for analyzing the captured workspace data to determining an operation to be performed based on identified tag information, tag identifying unit 362 for identifying and extracting tag information from the workspace data, AR display generating unit 363 for generating and rendering augmented reality displays using captured workspace data and generated overlays, transmitting unit 364 for transmitting AR data and instruction sequence to remote computing systems/servers, recording unit 365 for recording AR data and instruction sequences, and sequence identifying unit 366 for determining the sequence in operations should be performed. Although not explicitly shown, each of these units may be embodied in another computer program/utility, in electronic circuitry, or a combination of the two. Program modules 342 generally carry out the functions and/or methodologies of embodiments of the invention as described herein.

Computer system/server 312 may also communicate with one or more external devices 314 such as a keyboard, a pointing device, a display 324, digital camera 325, etc.; one or more devices that enable a user to interact with computer system/server 312; and/or any devices (e.g., network card, modem, etc.) that enable computer system/server 312 to communicate with one or more other computing devices. Such communication can occur via Input/Output (I/O) interfaces 322. Still yet, computer system/server 312 can communicate with one or more networks such as a local area network (LAN), a general wide area network (WAN), and/or a public network (e.g., the Internet) via network adapter 320. As depicted, network adapter 320 communicates with the other components of computer system/server 312 via bus 318. It should be understood that although not shown, other hardware and/or software components could be used in conjunction with computer system/server 312. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for generating a sequence of support instruction steps by leveraging Augmented Reality (AR), comprising:
    capturing workspace data from a workspace using a sensing device, wherein the workspace includes a plurality of components, at least one of the plurality of components having at least a tag which both specifies that a component having the tag is operably related to at least one other component and identifies an operation with respect to the at least one other component;
    identifying, from the workspace data, both a first tag of a first component of the plurality of components, and a second tag of a second component of the plurality of components;
    generating a database based on the first tag and the second tag by
        determining, based on respective shapes of the first and second tags, an operable relationship between the first and second components,
        determining, based on respective colors of the first and second tags, a first operation, and
        storing the operable relationship, the first operation, and at least a portion of the workspace data in the database;
    generating, based on operable relationships and operations stored in the database, a first overlay, wherein the first overlay includes at least one image corresponding with the first operation;
    determining a dominant hand of a user using previously stored user information;
    changing the shape and orientation of the at least one image in the first overlay based on determining the dominant hand of the user; and
    generating a first augmented reality display of a first instruction step by combining the first overlay with a display of the workspace data.

2. The method of claim 1, further comprising:
    identifying, from the workspace data, a third tag of a third component;
    updating the database with the third tag by
        determining, based on the third tag, a second operation using the third component, and
        storing the second operation in the database;
    comparing the third tag to one or more tags having operations stored in the database, wherein the one or more tags includes the first and second tags;
    determining, based on the comparing, that the first operation should be performed before the second operation;
    generating, based on operable relationships and operations stored in the database, a second overlay, wherein the second overlay includes at least one image corresponding with the second operation; and
    generating, an augmented reality display of a second instruction step by combining the second overlay with a second display of the workspace data, wherein the augmented reality display of the first instruction step is generated before the augmented reality display of the second instruction step.

3. The method of claim 1, further comprising:
    capturing a second set of workspace data using the sensing device;

identifying the first tag and at the least a third tag in the second set of workspace data;
determining that an incorrect operation was executed;
providing an indicator which indicates that an incorrect operation was executed;
generating a second overlay having at least one image corresponding with the indicator; and
generating, an augmented reality display of a second instruction step by combining the second overlay with a display of the second set of workspace data.

4. The method of claim 1, further comprising:
recording a sequence of images showing augmented reality displays of a plurality of instruction steps; and
transmitting the sequence to a server to allow a user having access to the server to process the sequence.

5. The method of claim 1, further comprising:
determining, based on a recorded sequence of support instruction steps performed at a first time, a set of images to include in an augmented reality display of an instruction step in a same sequence of instruction steps performed at a second time, wherein the first time occurs before a second time,
generating an second overlay, wherein the second overlay includes the set of images; and
generating, a second augmented reality display of the first instruction step by combining the second overlay with the first augmented reality display.

6. The method of claim 1, further comprising:
generating a second overlay having at least one image of a third tag, and an indication of a second operation, wherein the third tag is not identified in the workspace data,
wherein the third tag specifies that a third component having the third tag is operably related to the first component, and identifies an operation with respect to the first and third components; and
generating, an augmented reality display of a second instruction step by combining the second overlay with a second display of the workspace data.

7. An augmented reality system for generating a sequence of support instruction steps by leveraging Augmented Reality (AR), the augmented reality system configured to:
capture workspace data from a workspace using a sensing device, wherein the workspace includes a plurality of components, at least one of the plurality of components having at least a tag which both specifies that a component having the tag is operably related to at least one other component and identifies an operation with respect to the at least one other component;
identify, from the workspace data, both a first tag of a first component of the plurality of components, and a second tag of a second component of the plurality of components;
generate a database based on the first tag and the second tag by executing operations to:
 determine, based on respective shapes of the first and second tags, an operable relationship between the first and second components,
 determine, based on respective colors of the first and second tags, a first operation, and
 store the operable relationship, the first operation, and at least a portion of the workspace data in the database;
generate, based on operable relationships and operations stored in the database, a first overlay, wherein the first overlay includes at least one image corresponding with the first operation;

determine a dominant hand of a user using previously stored user information;
change the shape and orientation of the at least one image in the first overlay based on determining the dominant hand of the user; and
generate a first augmented reality display of a first instruction step by combining the first overlay with a display of the workspace data.

8. The augmented reality system claim 7, wherein the augmented reality system is further configured to:
identify, from the workspace data, a third tag of a third component;
update the database with the third tag by executing operations to
 determine, based on the third tag, a second operation using the third component, and
 store the second operation in the database;
compare the third tag to one or more tags having operations stored in the database, wherein the one or more tags includes the first and second tags;
determine, based on the comparing, that the first operation should be performed before the second operation;
generate, based on operable relationships and operations stored in the database, a second overlay, wherein the second overlay includes at least one image corresponding with the second operation; and
generate, an augmented reality display of a second instruction step by combining the second overlay with a second display of the workspace data, wherein the augmented reality display of the first instruction step is generated before the augmented reality display of the second instruction step.

9. The augmented reality system of claim 7, wherein the augmented reality system is further configured to:
capture a second set of workspace data using the sensing device;
identify the first tag and at the least a third tag in the second set of workspace data;
determine that an incorrect operation was executed;
provide an indicator which indicates that an incorrect operation was executed;
generate a second overlay having at least one image corresponding with the indicator; and
generate an augmented reality display of a second instruction step by combining the second overlay with a display of the second set of workspace data.

10. The augmented reality system of claim 7, wherein the augmented reality system is further configured to:
record a sequence of images showing augmented reality displays of a plurality of instruction steps; and
transmit the sequence to a server to allow a user having access to the server to process the sequence.

11. The augmented reality system of claim 7, wherein the augmented reality system is further configured to:
determine, based on a recorded sequence of support instruction steps performed at a first time, a set of images to include in an augmented reality display of an instruction step in a same sequence of instruction steps performed at a second time, wherein the first time occurs before the second time,
generate an second overlay, wherein the second overlay includes the set of images; and
generate, a second augmented reality display of the first instruction step by combining the second overlay with first augmented reality display.

12. The augmented reality system of claim 7, wherein the augmented reality system is further configured to:

generate a second overlay having at least one image of a third tag, and an indication of a second operation,
wherein the third tag is not identified in the workspace data,
wherein the third tag specifies that a third component having the third
tag is operably related to the first component, and identifies an operation
with respect to the first and third components; and
generate, an augmented reality display of a second instruction step by combining the second overlay with a second display of the workspace data.

13. A computer program product for generating a generating a sequence of support instruction steps by leveraging Augmented Reality (AR), the computer program product comprising a computer readable storage medium having program instructions embodied therewith, wherein the computer readable storage medium is not a transitory signal per se, the program instructions executable by a processing circuit to cause the processing circuit to perform a method comprising:
capturing workspace data from a workspace using a sensing device, wherein the workspace includes a plurality of components, at least one of the plurality of components having at least a tag which both specifies that a component having the tag is operably related to at least one other component and identifies an operation with respect to the at least one other component;
identifying, from the workspace data, both a first tag of a first component of the plurality of components, and a second tag of a second component of the plurality of components;
generating a database based on the first tag and the second tag by
determining, based on respective shapes of the first and second tags, an operable relationship between the first and second components,
determining, based on respective colors of the first and second tags, a first operation, and
storing the operable relationship, the first operation, and at least a portion of the workspace data in the database;
generating, based on operable relationships and operations stored in the database, a first overlay, wherein the first overlay includes at least one image corresponding with the first operation;
determining a dominant hand of a user using previously stored user information;
changing the shape and orientation of the at least one image in the first overlay based on determining the dominant hand of the user; and
generating a first augmented reality display of a first instruction step by combining the first overlay with a display of the workspace data.

14. The computer program product of claim 13, further comprising:
identifying, from the workspace data, a third tag of a third component;
updating the database with the third tag by
determining, based on the third tag, a second operation using the third component, and
storing the second operation in the database;
comparing the third tag to one or more tags having operations stored in the database, wherein the one or more tags includes the first and second tags;
determining, based on the comparing, that the first operation should be performed before the second operation;
generating, based on operable relationships and operations stored in the database, a second overlay, wherein the second overlay includes at least one image corresponding with the second operation; and
generating, an augmented reality display of a second instruction step by combining the second overlay with a second display of the workspace data, wherein the augmented reality display of the first instruction step is generated before the augmented reality display of the second instruction step.

15. The computer program product of claim 13, further comprising:
capturing a second set of workspace data using the sensing device;
identifying the first tag and at the least a third tag in the second set of workspace data;
determining that an incorrect operation was executed;
providing an indicator which indicates that an incorrect operation was executed;
generating a second overlay having at least one image corresponding with the indicator; and
generating, an augmented reality display of a second instruction step by combining the second overlay with a display of the second set of workspace data.

16. The computer program product of claim 13, further comprising:
recording a sequence of images showing augmented reality displays of a plurality of instruction steps; and
transmitting the sequence to a server to allow a user having access to the server to process the sequence.

17. The computer program product of claim 13, further comprising:
determining, based on a recorded sequence of support instruction steps performed at a first time, a set of images to include in an augmented reality display of an instruction step in a same sequence of instruction steps performed at a second time, wherein the first time occurs before the second time,
generating an second overlay, wherein the second overlay includes the set of images; and
generating, a second augmented reality display of the first instruction step by combining the second overlay with first augmented reality display.

18. The computer program product of claim 13, further comprising:
generating a second overlay having at least one image of a third tag, and an indication of a second operation,
wherein the third tag is not identified in the workspace data,
wherein the third tag specifies that a third component having the third tag is operably related to the first component, and identifies an operation with respect to the first and third components; and
generating, an augmented reality display of a second instruction step by combining the second overlay with a second display of the workspace data.

* * * * *